3,293,171
FLUIDIZED BED OPERATIONS
William Joseph Metrailer, Baton Rouge, La., assignor to Esso Research and Engineering Company, a corporation of Delaware
Filed Dec. 16, 1963, Ser. No. 330,869
6 Claims. (Cl. 208—163)

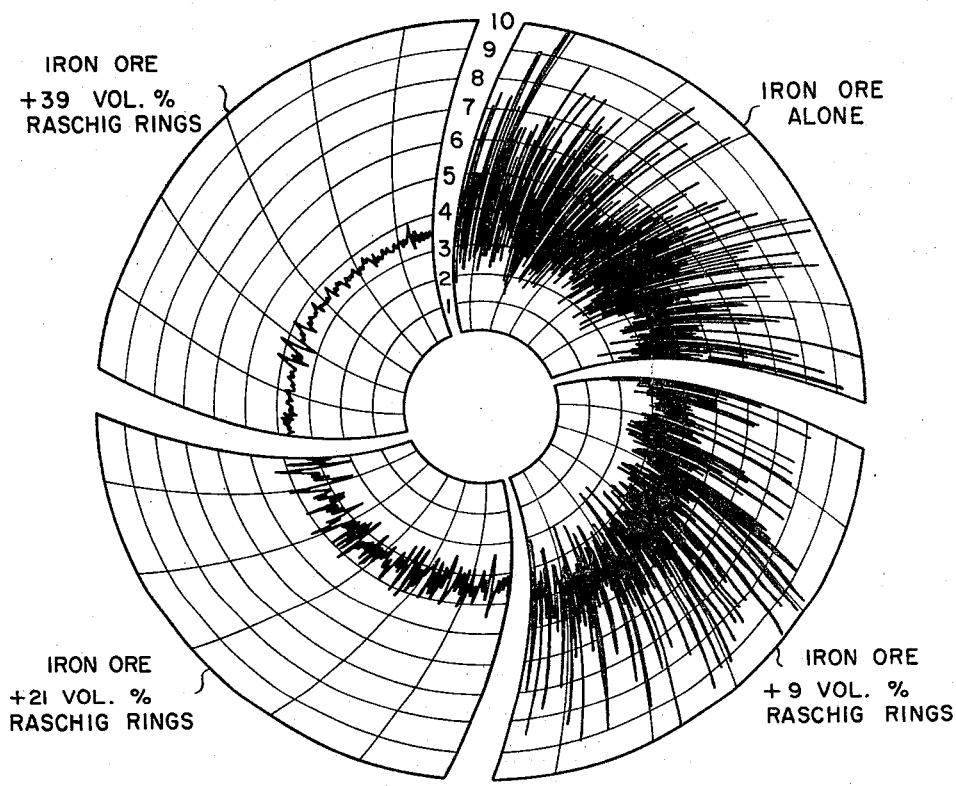

This invention relates to an improved method of carrying out a fluid bed operation. This invention relates to a method of improving gas solids contacting and for obtaining a more uniform gas flow through the bed. More specifically, this invention relates to a method of improving gas solids contacting and gas and/or solids utilization in fluid bed operations. The improvement is obtained by adding to the fluid bed free motion contactors having about the same density as the fluid bed. Specifically, this invention relates to a method of improving gas solids contacting and gas flow through a fluid bed which comprises adding to the fluid bed free motion contactors which have about the same density as the apparent density of the solids in the fluid bed. The contactors are selected to be substantially larger in size than the largest particles in the bed.

It is known to contact beds of solid particles with gases to fluidize the particles in order to carry out reactions of the gaseous materials and/or reactions of the solid particles or both. Heretofore, fluid solids gas contacting processes have been carried out on a commercial scale with particles having narrow size distribution as well as with solids of wide size distribution. Though fluidized bed reaction zones can be maintained and the reactions can be carried out, it was found that inefficient gas solids contacting and inefficient gas and/or solids utilization resulted even when fluid bed conditions were maintained. This lowered the efficiency of the reaction, making the process uneconomical in many cases. The inefficient gas-solids contacting is caused by large gas bubbles passing through the bed resulting in considerable fluctuation in pressure drop across the fluid bed. This phenomenon is known as slugging. Also, gas by-passing due to slugging, and the Gulf Stream effect on solids flow in the bed result in inefficient gas solids contacting. To a certain extent, improved fluid bed operations have been obtained by carefully controlling the particle size distribution and only fluidizing those particles that have an even or a narrow particle size distribution. However, it is very difficult to obtain all materials in a narrow particle size distribution and to maintain such a narrow particle size distribution in a particular reaction zone. This, of course, varies with the particular system. For example, in catalytic cracking narrow particle size catalysts can be obtained and maintained in a narrow size range. However, in reducing metallic oxides to metal in a reduction process, it is found that the metallic oxides tend to attrite and form large numbers of small particles, thereby disrupting any pre-planned particle size distribution for the fluid bed operation.

Fluid bed processes are well known. In a fluid bed operation, the gas velocity is correlated with the particle size and density of the solid material so as to maintain the finely divided solids in a dense turbulent state simulating a boiling liquid. The finely divided solids undergo extensive vertical and horizontal motions and assume a pseudo liquid level. The fluidizing gas velocity selected for each operation depends on the density and state of subdivision of the particular solids to be fluidized. Applicant has unexpectedly found that the addition of free motion contactors in a fluid bed provide substantial improvement in gas solids contacting efficiency and substantially reduces the pressure drop fluctuation across the bed.

In accordance with the present invention, relatively large free motion contactors having a density about equal to the fluid bed density of the fluidized solids, i.e., the apparent density of the fluidized bed of solids under normal fluid bed operating conditions, are added to the bed to improve the gas-solids contacting. The contactors can be of aerodynamically unstable design to induce turbulence in the fluid bed as they move freely in suspension. The size of the contactors and the amount of contactors used will depend upon the degree of contacting desired in a particular system in which they are used. The use of free motion contactors has resulted in remarkable improvements in the fluidization characteristics of fluidized beds of solids. The contactors move freely throughout the bed.

Slugging is caused by the presence of large gas bubbles passing through a fluid bed of solids, which results in considerable variation in pressure drop across the bed and inefficient gas solids contacting. One of the most surprising results of adding applicant's free motion contactors to a fluidized bed is that they tend to break up the large bubbles and prevent slugging and produce a more uniform flow of fluidizing gas through the bed. For example, with only about 9 bulk volume percent of contactors added to the fluidized bed, it can be visually seen that the contactors fall through the large gas bubbles tending to break them up and with about 39 bulk volume percent of the contactors, the large gas bubbles have completely disappeared. Bulk volume includes actual volume of solids displaced by contactor plus any void space in the contactor. Also, contactors which have been properly selected as to their density and size and added to a fluid bed can be visually seen to move up and down in the bed along the walls. This free motion of the contactors in the fluid bed indicates that they have disrupted the Gulf Stream solids circulation pattern normally present in a large fluid bed. Selection of contactors of proper density is of major importance. The contactors selected, for best operations, will have a density between the free settled density of the bed of particles and of about 90% of the fluidized bed density, that is, apparent density.

The particle sizes of the particles being fluidized in accordance with the present invention can be either of narrow size or wide size distribution and the particle sizes can be selected for the particular system used so that they can conveniently be fluidized. Applicant's novel contactors can be used in any solids system which can be fluidized. They can also be used in systems which heretofore could not maintain their fluid state but can be maintained in a fluid state by addition of applicant's free motion contactors. The fluidizing gas velocity used is sufficient to fluidize the solids in the bed. The gas can be an inert fluidizing gas or a reactant gas or mixtures of both. The density of the contactors is selected so that when the bed is fluidized, the contactors move in free motion from top to bottom and around in the bed. It is this free motion of the contactors in the bed which breaks up the large gas bubbles (which bubbles cause slugging) and which also disrupts the Gulf Stream effect movement of the solids in the bed. The contactors generally are at least twice as large as the largest size particle in the bed and the size and number of the contactors, as well as their shape, are selected for the particular system. A sufficient amount of contactors is added to the fluid bed to break up the large gas bubbles and to obtain a substantially reduced pressure drop fluctuation across the bed. Materials from which the contactors are made are selected so that they have the proper density and are usually unreactive, though they can comprise catalytically active or chemically reactive material.

The use of applicant's free motion contactors can be advantageous in many known fluid bed operations. One such application is fluid bed catalytic cracking. Any slight improvement in the gas solids contacting effectiveness in a fluid catalytic cracker achieved by utilization of applicant's novel free motion contactors will result in a substantial economic improvement in the process. One of the primary problems in catalytic cracking in the commercial operation has been that it has not been possible to find an effective means of reducing the diameter of the fluidizing gas bubbles and the velocity of the bubbles through the catalytic cracker which has caused a less efficient operation than could be obtained if large bubbles were eliminated from the fluid bed. By using applicant's free motion contactors having the proper density and at least two times larger in size than the catalytic particles in the catalytic cracker, the gas bubbles are broken up and a substantially improved gas-solids contacting in the catalytic cracker bed is effected.

Another process in which applicant's novel contactors can be utilized would be in a catalytic hydroforming process. In such reactions, both catalyst contacting and gas staging are important. The latter limitation has for practical purposes forced the process to be carried out by fixed bed operation. The addition of the applicant's contactors in accordance with the method described in this application would allow hydroforming to be carried out in a fluid bed reaction zone, which would be advantageous because of the heat requirements of the process. The free motion contactors would prevent back-mixing by disrupting the Gulf Stream effect in the fluidized bed.

Another well-known process in which this invention has application is in the reduction of metallic oxide ores to free metal. An example of such a process is a direct reduction of iron oxides to metallic iron by direct contact in a fluid bed with reducing gases consisting of hydrogen and/or carbon monoxide gas. In attempting to carry out the commercial reduction of iron ore by the direct reduction method in fluid beds, several problems have arisen. Inefficient utilization of the reducing gases has been one of the major problems preventing large scale commercialization of this technique. Inefficient gas utilization can be caused by slugging and by-passing of the gas through the fluid bed of iron ore. Inefficient gas utilization, particularly in the iron ore reduction process, has been indicated by severe pressure fluctuations across the fluid bed.

The figure of the drawing is a graphic illustration of the improvement in slugging and pressure drop fluctuation across a fluid bed of iron ore.

The principal advantages obtained in utilizing applicant's novel gas-solids contacting in the manner described in the application are that the free motion contactors break up large gas bubbles, prevent gas by-pass, and disrupt the Gulf Stream effect. This results in more efficient gas-solids contacting and gas utilization in the fluid bed operation, eliminates slugging, and minimizes the pressure drop fluctuation across the bed.

The present invention can be utilized in any gas-solids contacting process where the solids of either narrow or wide size particle distribution are contacted with a fluidizing gas. Utilization of applicant's free motion contactors results in substantial advantages in fluid bed operations where particle size distribution of the material being fluidized and/or undergoing reaction tends to change during the process due to chemical reaction, attrition or agglomeration of the particles.

Any solids which are fluidizable can be used in conjunction with applicant's contactors. Solids fluidized can be selected from finely ground metal oxides, coke materials, solid absorbents, such as well-known molecular sieve absorbents, catalysts, such as catalytic cracking and hydroforming catalysts, and heat carrier particles wherein the solids are used to transfer heat. Specific metal oxides would be metal oxides which exist as their ores which are reacted with reducing gases to produce metallic metals.

The solids can be of either wide or narrow particle size distribution, or have a particle size distribution where the particles are all about the same size. Particle size distribution can be random size with about an even percentage of each size in the size range within the composition or the particle can be of a dumbbell composition size with low concentration of the particle sizes in the middle size range and heavy concentration at either end of the particle size distribution. On the particle size distribution may be such that it is weighted at one end of a particle size with very few particles throughout the rest of the range in the particle distribution. Any particle size distribution which can be fluidized by contacting with a fluidizing gas, and/or which can be fluidized by the addition of contactors, is considered to be within the scope of the present invention.

The particle size of the solids treated can generally vary between 5 microns and 10,000 microns, or between about 10 microns to 7500 microns, and between about 40 microns to 5,000 microns.

The superficial linear velocity of the fluidizing gas in the fluid bed is sufficient to obtain a fluid bed of the solid particles undergoing treatment. The velocity of the fluidizing gas is such that it is sufficient to lift up and buoy the solid particles and the contactor particles in such a manner that they are fluidized and the fluidizing particles appear to take on the characteristics of a liquid. The contactors are maintained in free motion throughout the fluidized solids bed.

The pressure at which the fluidizing bed operation is carried out, other than for chemical equilibria considerations, is not critical. The temperature at which the operation is carried out will be determined by the particular reaction desired to be carried out in the fluid bed. Types of gases that can be used could be inert fluidizing gas such as $N_2$, a gas reactant such as a vaporized chemical stream, or a liquid hydrocarbon which is vaporized on contact with the hot solids, or vaporized hydrocarbons which are cracked and react with the solids, and the like. Another gas that can be used is a reducing gas used for carrying out the reduction of metallic oxides to metal consisting essentially of hydrogen and/or carbon monoxide. Other gas streams which can be contacted with solids can be selected streams from which it would be desirable to extract a particular hydrocarbon by the solids in the bed. Also, gas streams which it is desired to be cooled or heated may be contacted with the fluidized beds of solids.

Applicant's invention is in adding to a fluid bed of solids applicant's novel free motion contactors which are selected in size, shape and density so that they float freely throughout the fluidized bed of solids to obtain a more efficient gas-solids contacting in the bed and to substantially reduce the pressure fluctuation across the bed. The fluidizing gas velocity is selected so that it fluidizes the solids in the bed and, depending on the gas and solids being contacted, can have a linear gas velocity of 0.5 to 10 feet/second or, more generally, 1 to 5 feet/second.

The selection of contactors to be used in a particular fluid bed system is critical. The contactors must have the proper density so that they can move freely in the particular fluid bed system in which they are used. The materials from which contactors can be made will be generally materials which do not take part in the reaction in the fluid bed. However, catalyst and chemically reactive contactors can be used. The density of the contactors is selected so that the contactors float freely throughout the fluid bed. The density of the contactors can be plus or minus about 20% by weight of the fluidized density of the particles, that is, the apparent density of the particles, and generally, plus or minus 10% of the apparent density of the particles being fluidized. Preferably, the contactors can be between plus or minus 5% by weight of the apparent density of the fluid bed. The contactors can be so shaped as to be aerodynamically unstable to improve and induce turbulence in the fluid bed as they move around freely in suspension.

The size of the contactors will be determined by the size of the particles in the bed and the particle size distribution in the bed. Contactors can be as small as ¼ inch and as large as 12 inches, depending upon the degree of contacting desired. Also, more than one size, shape or density contactor can be included in a fluidized bed. Generally, a single, uniform size and shape and density contactor will be used in a particular fluid bed reaction zone. Depending on the particles undergoing fluidization, the contactors can be 1 to 200 times the diameter of the largest particle in the bed, generally 2 to 20 times and preferably 3 to 10 times the diameter of the largest particle in the bed. The size of the contactors is such as to substantially increase the average size of the particles in the fluid bed. The particles can be shaped as spheres, Raschig rings, donuts, washers, squares, rectangles, chain links, hour glass shaped, etc. Low volume density contactors are preferred in some system, such as the donut shaped Raschig rings, or chain link shaped Raschig rings. These would have a low volume density due to the holes through the rings. Contactors can be formed from low reactivity coke, from metals, particular types of wood, foamed refractories such as aluminum oxide which is foamed to the proper desired density, catalytic material which would be used as a contactor and also carry out the catalytic function, and the like. In certain systems, molded plastic shaped contactors can be used. In other systems, aluminum shaped contactors can be used. Selection of a particular type of material will depend on the service it is to be put to, its density, volume density, bulk density, and resistance to or contribution to the reactivity in the bed.

The amount of contactors added to a particular bed will depend on the particular system. A sufficient amount of contactors are added to the fluid bed to prevent slugging and to minimize the pressure drop fluctuation across the bed and to disrupt the Gulf Stream effect of the solids in the bed. The contactors can be added in an amount of 5 to 90 bulk volume percent of the total solids of the bed, or more generally 10 to 60 bulk volume percent of the solids in the bed, and specifically about 15 to 40% of the volume of solids in the bed. The actual volume of the contactors when using high void volume contactors, for example, with 50–80% voids, can be 3 to 25 volume percent based on total solids volume, generally 5 to 20 volume percent, and more generally 5 to 15 volume percent.

Where the primary object is to reduce slugging, 5 to 50 bulk volume percent of contactors is added. Where solids back-mixing is of primary concern, 20 to 90 volume percent of contactors is preferred.

The bulk density of a particular contactor is determined by the weight of contactors that it takes to fill a container when poured into a container of known volume in a random manner to form a settled, loosely packed bed of contactors. The bulk density varies with the shape of the contactor, for example, oval shaped Raschig rings may pack to 80% void space and spheres to about 40% void space. A fluidized bed of fine solids containing, for example, 100 bulk volume percent of spheres would contain about 60 wt. percent spheres and 40 wt. percent fine solids. The bulk volume of contactors added to a fluidized bed of solids is calculated by dividing the actual weight of contactors by the bulk density of the contactors.

Any type of suitable contacting vessel can be used in accordance with the present invention, which vessel can hold solids to be fluidized and which vessel is adapted to passing gas through solids in the vessel in such a manner that the solids in the vessel will be fluidized. The vessels will be made of suitable materials to withstand the temperature and pressure at which a desired reaction is to be carried out. The vessels will have means for introducing contactors to the bed and controlling the concentration of contactors in the bed. Contactors can be removed with the solids in which they are fluidized or can be separately screened while in the reactor from the solids prior to removing the solids from the bed. If desired, the apparatus can be set up so that the contactors' motion can be restricted to one vessel in a multiple vessel process, or restricted to one section of a vessel in a single vessel process by the use of grids and/or baffles to improve contacting and/or staging in a particular vessel. In certain systems it may be desirable to leave the free motion contactors in the solids such as in a transfer line burner operation and heat the solids and the contactors in the burner and return solids and contactor back to the fluid bed. In a catalytic reaction the contactors may be removed with the catalysts and returned to the reactor with the regenerated catalyst. Various alternatives which would be obvious to those skilled in the art are intended to be encompassed in a present disclosure. The apparatus and methods of building the apparatus and connecting the various portions of the apparatus as to carry out applicant's desired purpose are within the skill of those skilled in the art and need not be described in any greater detail.

The invention and its advantages will be better illustrated by the following examples.

*Example 1*

In a preferred embodiment of the present invention, iron oxide ores are reduced to metallic iron. Only the ferrous reduction stage will be discussed in detail, where the FeO is reduced to Fe since this is the stage in which slugging and pressure fluctuation drop across the bed is the most critical and has the most serious effect on the reducing gas utilization and reduction efficiency of the iron oxide to iron. In this example, a reducing gas consisting essentially of 40 volume percent $N_2$ and 60 volume percent hydrogen and 0 to 60 volume percent carbon monoxide based on nitrogen and hydrogen is directly contacted with the partially reduced iron ore consisting essentially of FeO and Fe. The reduction is carried out at a temperature of 1100 to 1400° F. and at a pressure of 5 to 20 p.s.i.a. The feed to the FeO/Fe reducing zone is analyzed and found to have a particle size distribution shown below in Table I.

TABLE I.—PARTICLE SIZE DISTRIBUTION OF FEED

| Size screen: | Percent solids on screen |
|---|---|
| 4 mesh (4699 microns) | -- |
| 14 mesh (1168 microns) | 21 |
| 28 mesh (589 microns) | 16 |
| 48 mesh (295 microns) | 14 |
| 100 mesh (147 microns) | 14 |
| 200 mesh (74 microns) | 13 |
| 325 mesh (44 microns) | 12 |
| Pan mesh | 10 |

The range of particle size of the feed is minus 4 mesh to minus 325 mesh with 90 weight percent of the particles being between 4 mesh and 325 mesh. The average mean particle size of the particles in the bed is about 48 to 65 mesh. These iron ore particles are fed to a bed 20 to 25 feet in diameter and 15 to 25 feet in height and the bed height is maintained by continuously feeding partially reduced iron ore to the bed and continuously withdrawing an equivalent amount of 85% metallized iron. The fluid bed is at a temperature of 1100–1400° F. The bed is maintained in a fluidized state by feeding the reducing gas to the bed at a superficial linear gas velocity of about 2 to 3.5 ft./sec. About 85% metallized product is withdrawn from the bed at the rate of 1 ton/day. The bed is observed to have a substantial pressure drop fluctuation across the bed even though the bed is fluidized. Also, substantial slugging and entrainment of fines in the fluidizing gas results due to the presence of large gas bubbles passing through the bed. The apparent density of the fluidized bed of partially reduced metallic iron is about 110 lbs./ft.$^3$. To this bed is added about 35 bulk volume percent of spherically shaped low reactivity carbon particles having a displacement density of about 106 lbs./ft.³. It is found that while adding the carbon contactors that the fluidization of the bed gradually smooths out, the slugging substantially subsides, and the pressure drop fluctuation across the bed becomes uniform at a substantially lower value. It is found that the gas utilization and gas solids contacting efficiency are substantially improved by the addition of the contactors to the bed. The low reactivity carbon contactors have several advantages in that they do not readily react with the ore or the metallic iron and the metallic iron does not stick to the contactors.

*Example 2*

In another run low reactivity solid carbon extrudates 1½ to 1 inch in length and about ⅝ inch in diameter and having a displacement density of 85 lbs./cu. ft. were added to a fluid bed of iron ore having an apparent density of 90 lbs./cu. ft. which was at a temperature of about 800° F. The bed was fluidized with nitrogen at a superficial linear gas velocity of about 1 ft./sec. About 3 volume percent of contactors were added. The solid carbon contactors in the fluid bed could visually be seen to move freely throughout the bed and be seen periodically in the top of the bed. The visual observance of the contactors clearly illustrates the free movement of the contactors throughout the fluid bed.

*Example 3*

In another run, a fluidized bed of iron ore which was one foot in diameter and four feet in height, which contained 350 lbs. of partially reduced iron ore, was used. The fluidizing gas had a superficial linear gas velocity of about 3 ft./sec. The ore, prior to reduction, had been ground in a conventional manner to obtain a fluidizable particle size distribution for the initial reduction step. Normal grinding of the ore, plus decrepitation and attrition in normal processing resulted in a particle size distribution which was difficult to fluidize. The high density of the iron ore further aggravated the problem. The particle size distribution of the partially reduced iron ore fed to the fluidized bed is shown in Table II.

TABLE II.—IRON ORE PRODUCT USED IN FLUIDIZATION STUDIES
[Fior products]

Cumulative, wt. percent on—
| | |
|---|---|
| 14 mesh | 17.7 |
| 28 mesh | 33.9 |
| 48 mesh | 47.9 |
| 100 mesh | 62.7 |
| 200 mesh | 76.7 |
| 325 mesh | 84.8 |
| Pan | 15.2 |
| Total Fe, wt. percent | 91.92 |
| Wt. ratio Fe/O | 11.3/1 |

The apparent density of the fluidized bed of partially reduced iron ore was about 110 lbs./cu. ft. Prior to the addition of contactors, the pressure drop fluctuation across the fluid bed was measured and found to be 4 to 4½ p.s.i.g. (see the figure of the drawing). This resulted in substantial slugging and entrainment of fine particles in the fluidizing gas and, in general, a relatively rough fluid bed.

The fluidized bed was 12 inches in diameter and about 4 feet in height. To this fluid bed applicant added carbon Raschig ring contactors. The Raschig rings were 1¼ inch outside diameter by ⅞ inch inside diameter and 1¼ inch in height. The liquid displacement density of the Raschig ring contactors was 106 lbs./cu. ft. The bulk density of the Raschig rings was about 31 lbs./cu. ft. (they pack to give about 70% void volume). Four separate runs were carried out. In the first run there were no contactors, and in the second run there was 9 bulk volume percent, and the third run 21 bulk volume percent and in the last run 39 bulk volume percent contactors. The effect of adding the contactors in accordance with the present invention was very pronounced. Slugging was eliminated and the pressure drop fluctuation across the fluid bed was substantially reduced as shown below in Table III.

TABLE III

| Vol. percent (Bulk)[1] of Bed Occupied by Carbon Raschig Rings | Volume of Bed (Actual) Occupied by Raschig Rings | ΔP Fluctuations Across Fluid Bed P.s.i.g. |
|---|---|---|
| 0 | 0 | 4 to 4.5 |
| 9 | 3 | 2-3 |
| 21 | 6 | 0.5-1 |
| 39 | 12 | 0.1-0.4 |

[1] Based on bulk density of Raschig rings of 70% void volume.

With only 9 bulk volume percent added contactors the contactors could be seen moving through the large gas bubbles. With 39 bulk volume percent the large bubbles had disappeared. Also, the contactors could be seen to move both up and down along the vertical walls of the fluid bed. This indicates that they had disrupted the Gulf Stream solids circulation pattern normally present in fluid beds. The fluidizing vessel used in this case was a transparent plastic vessel, the fluidizing gas was air, and the contacting was carried out at about room temperature to permit these visual observations.

The data obtained from the runs are illustrated in the figure of the drawing. It can be seen from the drawing that both of the frequency and amplitude of the variation in pressure drop across the fluid bed decreased as the quantity of Raschig rings increased. The addition of 39 bulk volume percent contactors reduced the amplitude of the pressure variation from about 4 p.s.i.g. to about 0.4 p.s.i.g.

*Example IV*

In another run, a 3-inch inside diameter glass column was filled with partially reduced iron ore, having an Fe/O wt. ratio of about 11.2 to 1, to a height of 12 inches. Air was used as the fluidizing gas and was introduced at a superficial linear gas velocity of 1 to 2.5 ft./sec. Fluctuations in pressure drop across the bed due to slugging was measured. Carbon Raschig ring contactors of 1¼ inch outside diameter times ⅞ inch inside diameter and 1¼ inch in length were added. The Raschig rings were calculated to have a 31 lbs./cu. ft. bulk density and a displacement density of about 106 lbs./cu. ft. Fluidization was carried out with gas velocities of 1 to 2.5 ft./sec. and with the addition of 0 to 50 bulk volume percent of contactors. The results are indicated below in Table IV.

TABLE IV.—FLUIDIZATION TEST WITH IRON ORE FLUIDIZED WITH AIR

| Bulk Vol. Percent Raschig Rings | In. Hg Variation in Delta-P | | | |
|---|---|---|---|---|
| 0 | 0.2 | 0.6 | 1.4 | 1.4 |
| 25 | 0.2 | 0.6 | 0.8 | 0.8 |
| 50 | 0.1 | 0.4 | 0.5 | 0.9 |
| Fluidizing Gas Velocity, Ft./Sec | 1.0 | 1.5 | 2.0 | 2.5 |

It is seen that considerable improvement in fluidization was obtained by the addition of the contactors. The addition of 25 vol. percent produced an improvement at higher velocities where slugging was most severe. The addition of 50 vol. percent produced an improvement at all conditions except the high velocity. This was probably due to the fact that the 1¼″ contactors were relatively large for the 3″ I.D. glass column at this gas velocity.

*Example V*

One of the most widely used processes which uses the fluidized bed technique is fluid catalytic cracking. Because of the tremendous installed capacity application of applicant's invention to this process, which results in a relatively slight increase in fluid solids contacting efficiencies, would give a substantial improvement in the economics of the process. It is well known that the effectiveness of gas catalyst contact in a fluid catalytic cracking process is limited by velocity and diameter of gas bubbles in the fluidized catalytic cracking catalyst bed. A means by which these bubbles could be reduced or made to disappear and any means by which the Gulf Stream characterized flow of particle solids through the bed could be disrupted will greatly enhance the gas-solids contacting and the overall efficiency of the catalytic cracking process. In accordance with this embodiment, a fluid catalytic cracker 30 feet in diameter and 25 feet in height is used. The catalyst consists essentially of silica-alumina and contains about 25% $Al_2O_3$. This is a conventional catalytic cracking catalyst and is relatively uniform in size. The catalyst has the particle size distribution shown below in Table V.

TABLE V

| Particle diameter, microns: | Wt. percent |
|---|---|
| 0–20 | 6 |
| 20–40 | 27 |
| 40–60 | 47 |
| 60–80 | 18 |
| 80+ | 2 |

This catalyst has a loose bulk density of 50 lbs./cu. ft. and an apparent density of 42 lbs./cu. ft. at its minimum fluidization velocity. The bed is fluidized by the cracked products of a hydrocarbon feed boiling in the range of 450 to 1000° F. The cracking and vaporization of the hydrocarbon feed produces a fluidizing gas having an average superficial linear gas velocity of about 2.0 ft./sec. A contactor 3 inches in diameter and having a displacement density of 39 lbs./cu. ft. is selected. The contactor is made of expanded high grade alumina and is shaped like a section of a 3-inch diameter pipe, i.e., 2.5 inches inside diameter and 3 inches long. The catalytic cracker operates at a temperature of 900–960° F. Applicant's contactors are continuously added to the bed and the pressure drop fluctuation across the bed is continuously measured. It is found that after adding about 20 to 40 bulk volume percent of the contactors to the fluidized catalyst bed, the pressure fluctuation across the bed is substantially improved and gas-solids contacting efficiency is improved by about 20%.

The technique of the present invention consists primarily in adding contactors having the proper density and shape to a bed of particles undergoing fluidization. A sufficient amount of the contactors are added to the bed to substantially eliminate slugging and to minimize the pressure drop fluctuation across the bed. This results in more efficient fluidization, more efficient gas-solids contacting, and gas and catalyst utilization. This technique can be used in contacting any solids with any gases and has particular application to fluid bed operations where particle size distribution of solids fluidized is difficult to control. By measuring the pressure drop fluctuations across the bed, the amount of contactors required in the bed can be periodically changed by the addition of contactors or removal of contactors to maintain the pressure drop fluctuation across the bed at the minimum value. This technique can be used with particles of either narrow or wide size distribution.

Applicant's technique of adding contactors to fluid bed operations can lead to improved contacting and solids staging in adsorption and desorption processes. Also, contactors can be made out of catalytic materials and suspended in an inert fluidized bed of proper density to obtain more efficient contacting in the bed. Also, general processing operations can be carried out, such as heat treating or drying of odd shaped material by including the material in a proper density fluid bed.

In the utilization of applicant's contactors to smooth out the fluidized bed operation, it is contemplated that a coarser cracking catalyst than heretofore has been possible to be utilized can be fluidized and used in conjunction with applicant's free motion contactors. Up until now it has been necessary to use a very narrow particle size distribution cracking catalyst. Coarser catalysts having diameters in the range of 100 to 1000 microns have generally been avoided because of poor fluidization characteristics.

In a hydrodesulfurization process which is carried out at conditions where the feed is in the vapor phase, there are two alternatives which may be used. You could use a fluidized catalyst and a contactor or form a supported catalyst into a contactor and use a denser, fine material in a fluid bed to support the catalyst contactor. It is possible by proper choice of support preparation techniques and/or catalyst impregnation to make both the contactor and the denser fines catalytic.

In a hydrocracking application of the present invention, the catalyst contactor can be predominantly a hydrogenation catalyst, and the denser fine materials can be predominantly a cracking catalyst. In such a system the relative cracking to hydrogenation could be controlled independently by controlling the relative quantity and/or circulation rates of each of the catalytic materials. Both of the above processes require good temperature control which can be obtained in a fluid bed operation.

Obviously, many other modifications and variations of the invention as heretofore set forth may be made without departing from the spirit and scope thereof. And therefore, only such limitations should be imposed as are indicated by the appended claims.

What is claimed is:

1. A process for improving a fluidized bed operation wherein said bed is fluidized with a gaseous fluid which comprises adding to a fluidized bed of particles free motion contactors consisting of a material having a density within the range of plus or minus 20 wt. percent of the apparent density of said fluidized bed under normal fluid bed operating conditions, wherein said contactors are at least twice as large as the average size particle in said bed and said contactors are added in a sufficient amount to substantially reduce the pressure drop fluctuation across the fluidized bed.

2. The process of claim 1 wherein the density of said contactors is between the settled density of the particles and about 90 wt. percent of the apparent density of the fluidized bed under normal fluid bed operating conditions.

3. The process of claim 1 wherein the contactors are at least twice as large as the largest particle in the bed.

4. The process of claim 1 wherein the contactors have a density in the range of plus or minus 10 wt. percent of the apparent density of said fluidized bed.

5. The process of claim 1 wherein slugging is substantially reduced by adding 5 to 50 bulk volume percent of contactors.

6. The process of claim 1 wherein solids back-mixing in the fluid bed is substantially reduced by adding 20 to 90 bulk volume percent of said contactors.

References Cited by the Examiner

UNITED STATES PATENTS

| 2,533,026 | 12/1950 | Matheson | 208—149 |
| 2,614,067 | 10/1952 | Reed et al. | 208—164 |

DELBERT E. GANTZ, *Primary Examiner.*

A. RIMENS, *Assistant Examiner.*